United States Patent
Cloeren (10) Patent No.: US 8,123,511 B2
(45) Date of Patent: Feb. 28, 2012

(54) DECOUPLED TRANSVERSE FLOW METERING GAP AND LIP GAP

(75) Inventor: Peter F. Cloeren, Orange, TX (US)

(73) Assignee: Cloeren Incorporated, Orange, TX (US)

( * ) Notice: Subject to any disclaimer, the term of this patent is extended or adjusted under 35 U.S.C. 154(b) by 1110 days.

(21) Appl. No.: 11/812,684

(22) Filed: Jun. 21, 2007

(65) Prior Publication Data

US 2008/0274223 A1    Nov. 6, 2008

Related U.S. Application Data

(63) Continuation-in-part of application No. 11/797,374, filed on May 3, 2007.

(51) Int. Cl.
*B29C 47/08* (2006.01)
*B29C 47/16* (2006.01)
(52) U.S. Cl. .......... 425/192 R; 425/382.4; 425/461
(58) Field of Classification Search .......... 425/192 R, 425/382.4, 461, 466
See application file for complete search history.

(56) References Cited

U.S. PATENT DOCUMENTS

| | | | | |
|---|---|---|---|---|
| 3,218,971 A | * | 11/1965 | Rowland | 101/401.1 |
| 3,480,998 A | * | 12/1969 | Von Erdberg | 425/133.5 |
| 3,877,857 A | * | 4/1975 | Melead | 425/133.5 |
| 4,372,739 A | | 2/1983 | Vetter et al. | |
| 4,379,806 A | * | 4/1983 | Korpman | 428/354 |
| 4,411,614 A | * | 10/1983 | Feathers | 425/466 |
| 4,695,236 A | | 9/1987 | Predohl et al. | |
| 4,708,618 A | | 11/1987 | Reifenhauser et al. | |
| 4,731,213 A | * | 3/1988 | Klepsch | 264/512 |
| 5,066,435 A | | 11/1991 | Lorenz et al. | |
| 5,147,195 A | | 9/1992 | Cloeren | |
| 5,256,052 A | | 10/1993 | Cloeren | |
| 5,451,357 A | | 9/1995 | Cloeren | |
| 5,505,609 A | | 4/1996 | Cloeren et al. | |

* cited by examiner

*Primary Examiner* — Joseph Del Sole
*Assistant Examiner* — Joseph Leyson
(74) *Attorney, Agent, or Firm* — Timothy R. Kroboth (57) ABSTRACT

The present invention provides a slot die that includes a flow passageway that includes a transverse flow-providing manifold, a flow metering section that provides a transverse flow metering gap, and an exit channel that includes an exit orifice. In accordance with the invention, a transverse flow metering gap may beneficially be selected independent of changing the gap or width of the exit office, using one or more normally non-adjustable die bodies.

17 Claims, 6 Drawing Sheets

DECOUPLED TRANSVERSE FLOW METERING GAP AND LIP GAP

REFERENCE TO A RELATED APPLICATION

This application is a continuation-in-part application of prior U.S. patent application Ser. No. 11/797,374, filed on May 3, 2007, entitled DECOUPLED TRANSVERSE FLOW METERING GAP AND LIP GAP.

FIELD OF THE INVENTION

This invention relates to a slot die for casting fluids, or for coating fluids onto various substrates.

BACKGROUND OF THE INVENTION

It is known that the volumetric flow rate of a fluid passing through a rectangular metering gap is governed by, and is inversely proportional to, flow resistance, where the flow resistance is comprehended by the formula $$\Delta P = \frac{12\eta L Q}{W H^3 F_p}$$

where P is Pressure, $\eta$ is the fluid viscosity, Q is the volumetric flow rate, W is the width of the flow channel transverse to the main direction of fluid outflow, L is the length of the transverse metering channel in the main outflow direction, H is the transverse metering channel gap, and $F_p$ is the geometric shape factor. It can be appreciated from this formula that volumetric flow rate is responsive to flow resistance and is particularly sensitive to the metering gap.

To provide regulation of the transverse mass flow distribution through a slot die, a transverse flow metering channel (commonly called a preland channel), is typically positioned between and in fluid communication with a transverse flow-providing manifold and an exit channel. The transverse flow metering channel provides regulation of the transverse distribution of a flow stream by regulating the resistance to flow through a combination of gap and gap length geometries defining the transverse flow metering gap and channel in accordance with the governing principles of the preceding formula. Depending upon process objectives, a transverse flow metering channel may be used to provide a generally uniform, or a non-uniform, casting or coating thickness.

Figure 1:
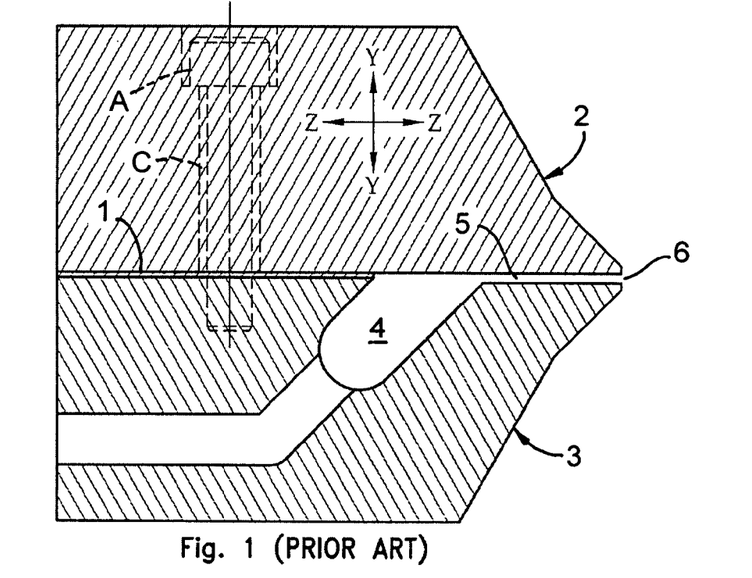
FIG. 1 is a cross-sectional view of a prior art slot die that includes a body shim, and that shows the Y-axis and Z-axis of an X-Y-Z coordinate system.

A conventional single cavity slot die as generally illustrated in FIG. 1, may include a body shim 1 disposed between two die bodies 2,3 to provide selection of a lip gap complementary to the processability and application of the particular fluid to be processed. A slot die flow passageway includes a transverse flow-providing manifold 4, a flow metering section 5 (preland channel) that provides a transverse flow metering gap, and an exit channel that provides a metering function and that includes an exit orifice 6 (the lip gap). Metering of the fluid through the lip gap is critical to the particular casting or coating process employed; and as a result, there is a need to select and establish an appropriate lip gap based on considerations including the particular fluid to be processed and/or the downstream process. To this end, a body shim may be beneficially selected to provide a predetermined lip gap, and as illustrated, is usefully disposed between the two die bodies and generally parallel to the Z-axis of an X-Y-Z coordinate system (see FIG. 5 for all three axes of the X-Y-Z coordinate system).

Figure 2:
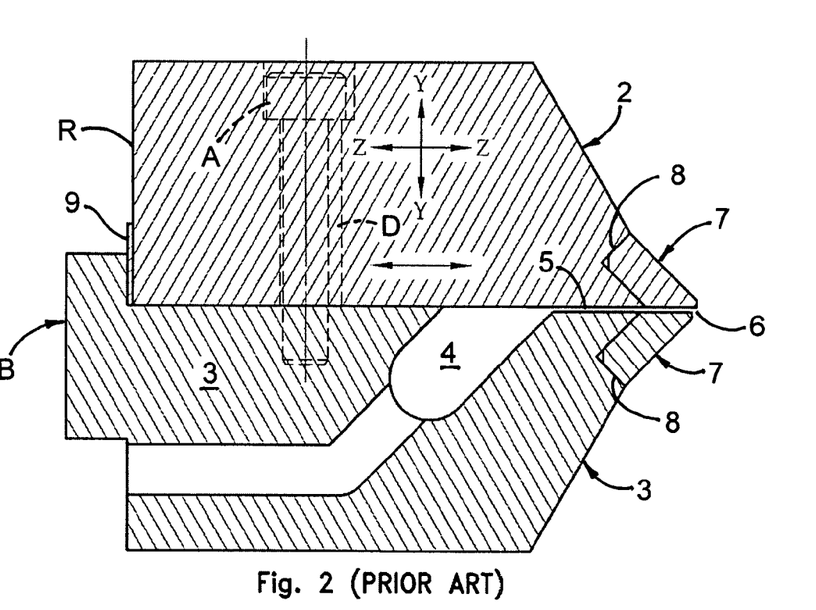
FIG. 2 is a cross-sectional view of another prior art slot die without a body shim, but that illustratively includes an optional combination of removably mounted lip inserts, and bolt clearance apertures (only one shown) and a backing shim for positioning of one lip beyond the other lip.

Without a body shim, the lip gap would be relatively smaller than illustrated (compare for example, to the lip gap of the slot die of FIG. 2). Body shims having a variety of thicknesses are available, and can be substituted for one another, to select a variety of predetermined lip gaps. A series of body assembly bolts A (only one shown) fasten die bodies 2,3 together and extend through mechanical clearance holes C (only one shown) in die body 2. A body shim can be replaced by disassembling the slot die to provide access to the body shim, substituting one body shim for another, and reassembling the die bodies back together.

Hypersensitivity of volumetric flow rate to metering gap changes in slot die processes, whether single cavity or multicavity slot dies, is known to be attributed to its inverse proportionality to flow resistance, as supported by the foregoing formula. As illustrated by U.S. Pat. Nos. 4,372,739 to Vetter, 4,695,236 to Predohl et al, 4,708,618 to Reifenhauser et al, 5,066,435 to Lorenz et al, and 5,147,195 to inventor Peter F. Cloeren, apparatus used for extruding thermoplastic resins may use a slidably adjustable restrictor bar to provide metering gap adjustment. Mechanical clearance allows movement of a restrictor bar, by a bolt that passes through a die body.

It is typical to change the exit orifice width to accommodate different product width requirements. Conventional external deckles are not suitable for slot die casting or coating processes, due to the close proximity of the die exit slot to the casting or coating surface, typically in the range of 50 to 3000 μm. Thus, a casting fluid or coating fluid is generally delivered from a slot die in close proximity to a casting or coating surface. Nor are slot dies suitable for conventional internal deckles, as generally illustrated in Cloeren U.S. Pat. Nos. 5,451,357 and 5,505,609, due to the relatively small metering gaps used. Accordingly, in a slot die, a deckle shim (see FIGS. 10 and 11 for illustrative prior art deckle shims) may be conveniently disposed between die bodies 2,3 instead of body shim 1 (see FIG. 1) to establish a predetermined lip gap (in which case it functions in part as a body shim) and a predetermined exit orifice width.

However, with reference again to the slot die of FIG. 1, a problem with the prior art use of a body shim or a deckle shim to establish a predetermined lip gap is that the shim also simultaneously changes the transverse flow metering gap of flow metering section 5. As can be appreciated from the very small transverse flow metering gaps customarily used and the resulting volumetric flow rate hypersensitivity, any change in the transverse flow metering gap can adversely affect the desired transverse metering of the fluid flow provided by metering section 5. Different approaches such as a two stage preland channel as exemplified by U.S. Pat. No. 5,256,052 issued to inventor Peter F. Cloeren, and a coat-hanger shaped preland channel, have been applied in the prior art slot die of FIG. 1 but found to be subject to volumetric flow rate hypersensitivity, and accordingly to be ineffective in sufficiently regulating the transverse flow through flow metering section 5 when a body shim or deckle shim of a different thickness is selected to establish a different predetermined lip gap.

Furthermore, in slot die casting or coating processes, adjustment of the transverse flow metering gap independent of changing the lip gap can be beneficial or necessary to accommodate process changes such as different flow rates, different fluid viscosities, and other process objectives.

With reference now to the slot die of FIG. 2, it is also known in the prior art to fit die bodies 2,3 with removably mounted lip inserts 7 to form exit orifice 6. Lip inserts are beneficial, for example, for general wear and tear purposes. Although not shown in FIG. 2, it is recognized that a lip shim can be inserted between a surface 8 of the removably mounted lip insert and the respective die body surface to establish the lip gap. However, a drawback for certain slot die applications, is a resulting interruption of the flow surface of the exit channel at the junction of the lip insert and the respective die body.

With continued reference to the slot die of FIG. 2, it is known for certain process applications to use an exit orifice in which one lip extends beyond the other lip. Die bodies 2,3 are normally non-adjustable relative to one another as a result of being fastened together by a series of body assembly bolts A (only one shown). However, loosening body assembly bolts A allows positioning of die bodies 2,3 relative to one another. To also allow the relative positioning, it is known for die body 2 to be provided with bolt clearance apertures D (only one shown), appropriately sized to provide for Z-axis relative movement of die bodies 2,3. It is also known for die body 3 to include a backing structure B, and for a backing shim 9 of an appropriate thickness to be removably disposed between backing structure B and a rear wall R of die body 2. The backing structure may, as illustrated, be an integral part of die body 3, or may be removably attached. For clarity of illustration, body bolt A is shown in a rearward position relative to clearance aperture D.

Accordingly, there continues to be a need for an improved slot die and methodology that provide for transverse flow metering gap adjustment independent of changing other flow channel metering gaps. Beneficially, an improved slot die would allow adjustment of a transverse flow metering gap independent and apart from changing the lip gap. Beneficially, an improved slot die would also allow selecting a different lip gap by the use of body shims of different thicknesses or otherwise, independent and apart from changing the transverse flow metering gap. Advantageously, an improved slot die would also allow selecting a different exit orifice width or dividing an outflowing stream into two or more streams by the use of deckle shims, independent and apart from changing the transverse flow metering gap.

SUMMARY OF THE INVENTION

The present invention is beneficially directed to a slot die having a functionally decoupled transverse flow metering gap and lip gap. An inventive slot die may be single cavity or multi-cavity, and may be used for casting fluids, or for coating fluids onto various substrates. These fluids may be slurries, solutions, suspensions of particles or colloids in fluids, emulsions, polymer melts, and so forth. Slot die process requirements and fluid properties are generally of a character such that micro metering gap changes propagate relatively macro changes to the transverse mass flow distribution. The present invention further includes methodology for adjusting a transverse flow metering gap of a slot die without changing the lip gap.

In accordance with the present invention, there is provided an improved slot die that includes a flow passageway that includes a transverse flow-providing manifold, a flow metering section including a metering gap that provides for transverse flow metering of a fluid passing therethrough, and that is in fluid communication with the transverse flow-providing manifold and an exit channel that includes an exit orifice (the lip gap) of the flow passageway. In accordance with the invention, an improved slot die further includes a first die body, a second die body having a metering face, and a third die body having an opposing metering face that beneficially cooperates with the metering face of the second die body to form the transverse flow metering section.

Unlike an adjustable restrictor bar, the die bodies are normally non-adjustable. In a first or normal condition of an inventive slot die, the die bodies are not positionable relative to one another. In the first condition of an inventive slot die, the die bodies are fastened together by a series of body assembly fasteners, and fluid processing may be carried out. However, in a second condition of an inventive slot die, the body assembly fasteners are loosened or appropriately withdrawn so that the die bodies are positionable relative to one another. In the second condition, fluid processing is not feasible. Subsequent to desired positioning, the die bodies are again fastened together.

In a first embodiment of the invention, the second die body or the third die body, when positionable, has an axis of movement that defines a Z-axis of an X-Y-Z coordinate system. In this embodiment, the metering gap of the transverse flow metering section is advantageously adjustable by movement of the second die body or third die body along the Z-axis, and is beneficially adjustable independent of changing the lip gap. If desired, the second die body and the third die body may be independently positioned to form the transverse flow metering gap.

Beneficially, the transverse flow metering gap is predetermined, and may be obtained by using a backing shim or the equivalent of an appropriate thickness or extent, for precision positioning of a positionable die body in a Z-axis direction. Alternatively or in combination, after appropriately removing the body assembly fasteners, the second die body or third die body may be exchanged for a different die body of, for example, different Z-axis extent, or having different metering face geometry.

In a second embodiment of the invention, in a first or normal condition of an inventive slot die, the second die body is non-adjustable. However, in a second condition of the inventive slot die in which condition the second die body is positionable, the slot die is appropriately disassembled including by sufficiently withdrawing the body assembly fasteners to provide access to the second die body and one or more body shims. In the second condition, the second die body has an axis of movement along the Y-axis of the X-Y-Z coordinate system. In this embodiment, the metering gap of the transverse flow metering section is advantageously adjustable by movement of the second die body along the Y-axis, and the metering gap may be adjusted independent of changing the lip gap.

As before, the transverse flow metering gap is advantageously predetermined, but in this embodiment, an inventive slot die beneficially includes at least one body shim to provide for adjusting the transverse flow metering gap. Positioning of the second die body in a Y-axis direction may be accomplished by changing the location of a body shim, or, if desired, a combination of body shims may be used. Furthermore, if desired, a combination of body shims may be used to also change the lip gap. Subsequent to desired positioning, the slot die is re-assembled.

Advantageously, the flow metering section, which provides the transverse flow metering gap, is disposed at an angle $\alpha$ ranging from about 20 to 160°, with respect to the Z-axis, which as explained, in a first embodiment of the invention is the axis of movement of a positionable die body. Preferably, the angle $\alpha$ is in the range of about 30 to 60°, or of about 150° to 120°, with respect to the Z-axis. An angle $\alpha$ of about 45° may provide the most suitable balance between fluid flow requirements, operability functionality and mechanical design requirements.

As mentioned, an inventive slot die may include a body shim. A body shim or a combination of body shims may be structurally disposed between the second die body and the first die body, and/or between the second die body and the third die body. In a first embodiment of the invention, when an inventive slot die is fastened together by a series of body assembly fasteners, a body shim is non-adjustable, but after the body assembly fasteners are loosened, a body shim may be positionable in a Z-axis direction. Beneficially in a first embodiment of the invention, a body shim, when positionable, may be positionable by movement consistent with Z-axis positioning of a positionable die body. To this beneficial end, an inventive slot die may further include alignment pins or fasteners that extend through the body shim.

Advantageously, an inventive slot die may include a deckle shim. A deckle shim is suitably disposed in structural contact with the first die body. Conveniently, a deckle shim may be maintained stationary in a Z-axis direction.

The first and second embodiments of the invention are not mutually exclusive. To the contrary, the second inventive embodiment may also utilize Z-axis positioning, and the first inventive embodiment may also utilize Y-axis positioning.

If desired for regulation of the lip gap, an inventive slot die may include removably mounted lip inserts with or without lip shims depending upon process requirements, or an adjustable lip. After the body assembly fasteners are loosened, if it is desired for one lip to be positioned beyond the other lip, the first and third die bodies are positionable along the Z-axis relative to one another.

The exit channel of an inventive slot die may extend generally along the Z-axis, and fluid flow through the exit channel may be generally in a forward Z-axis direction. To fasten the die bodies together, beneficially the body assembly fasteners extend through the first die body and are in axial alignment with the Y-axis of the X-Y-Z coordinate system.

Additional advantages and beneficial features of the present invention are set forth in the drawing and detailed description, and in part will become apparent to those skilled in the art upon examination of the drawing and detailed description or may be learned by practice of the invention. In the drawing and detailed description, there are shown and essentially described only preferred embodiments of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference now is made to the accompanying drawing which forms a part of the specification of the present invention, and which beginning with FIG. 3, illustrates preferred slot dies in accordance with the present invention. For clarity of understanding, certain features are exaggerated in relative size or have been omitted from certain Figures.

DETAILED DESCRIPTION OF THE INVENTION

In accordance with the present invention, there is provided an improved slot die and related inventive methodology. Fluids processed by a slot die in accordance with the present invention, may be slurries, solutions, suspensions of particles or colloids in fluids, emulsions, polymer melts and so forth. By way of example, these fluids may include carriers such as ketones including methyl ethyl ketone, acetone, methyl isobutyl ketone and cyclohexanone, methylene chloride, alcohols such as methanol, ethanol, n-propranol, isopropanol and isobutanol, cyclohexane, acetates including ethylacetate and n-butylacetate, glycols including ethylene glycol and propylene glycol, heptane, dioxane, toluene, xylene, tetrahydrofuran, and water. Organic or inorganic compositions processable using a slot die process, including low molecular weight polymers, can be processed using an inventive slot die.

Beneficially, an inventive slot die and related inventive methodology provide for adjustment of a transverse flow metering gap independent of changing the lip gap. The metering gaps employed in slot die processes are generally of a size such that micro metering gap changes propagate relatively macro changes to the transverse mass flow distribution. Slot die process requirements and fluid properties dictate that the transverse flow metering gap is generally in the range of about 50 μm-1000 μm, and the lip gap is generally in range of about 50 μm-500 μm.

In the description of the invention, relative terms such as "upper", "lower", "forward", "rearward", "upward", "rear" and the like have been used particularly with reference to the drawing to assist understanding.

Figure 3:
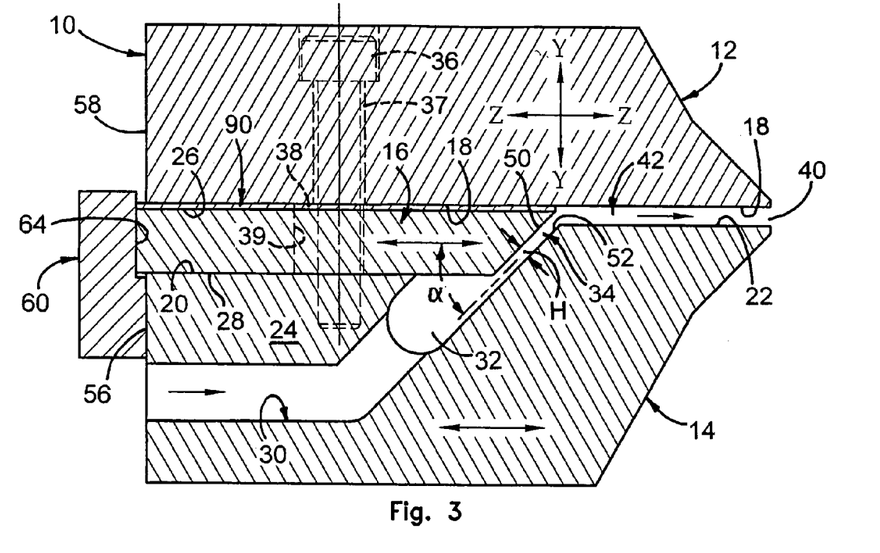
FIGS. 3 and 4 are simplified cross-sectional views taken at the center-line of a first embodiment of a slot die in accordance with the present invention, that includes a body shim and an especially exaggerated exit channel and bolt clearance apertures (only one shown), and which views together illustrate selectable movement of a die body in a Z-axis direction from a relatively rearward position that provides a relatively greater predetermined transverse flow metering gap, to a relatively forward position that provides a relatively smaller predetermined transverse flow metering gap.
Figure 4:
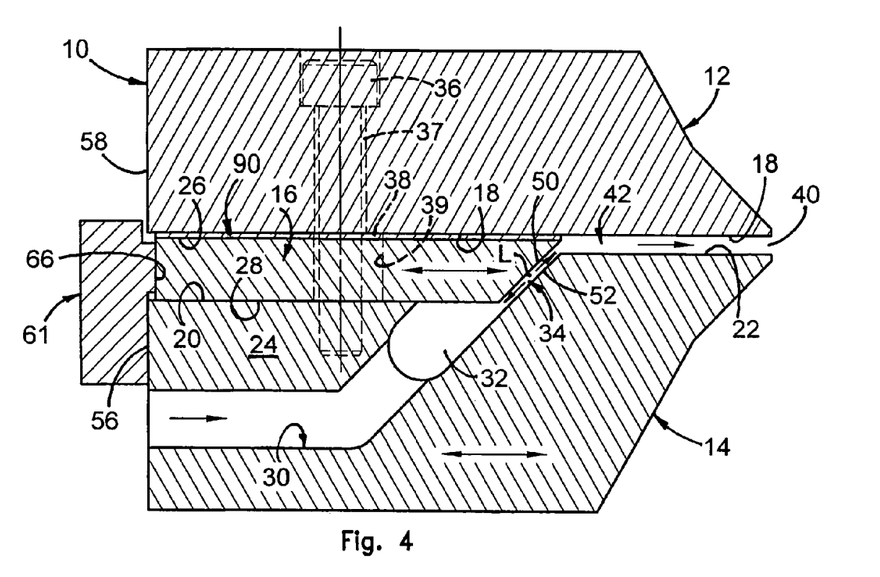

Referring to a first embodiment of an inventive slot die and beginning with FIGS. 3 and 4, a preferred single cavity slot die 10 in accordance with the present invention, includes an upper die body 12, and a lower die body 14 and a die body 16 that cooperatively provide for selection of a transverse flow metering gap H (shown in FIG. 3) of a transverse flow metering section 34. Preferred slot die 10 further includes a flow passageway 30, which includes transverse flow metering section 34, and a downstream exit orifice 40 (the lip gap).

Die bodies 12,14,16 are normally non-adjustable relative to one another. This corresponds to a first or normal condition of slot die 10, in which fluid processing may be carried out. In the first condition, die bodies 12,14,16 are fastened together by a series of body assembly bolts 36 (only one shown in FIGS. 3 and 4). In a second condition of slot die 10, the body assembly bolts are unfastened sufficiently so that die bodies 12,14,16 are positionable relative to one another. In the second condition, fluid processing is not feasible. Subsequent to desired positioning, the die bodies are again fastened together to provide for fluid processing. In the first condition of slot die 10, that is, when die bodies 12,14,16 are fastened together, there is no mechanical clearance to provide for the relative positioning, and as a result, die bodies 12,14,16 cannot be positioned relative to one another. Accordingly, during fluid processing, die body 16, unlike a restrictor bar, functions as a bearing member. By the term "bearing member" is meant, for purposes of this invention, a mechanical member that supports another mechanical member.

Beneficially, die body 16, when positionable, has an axis of relative movement that defines a Z-axis of an X-Y-Z coordinate system (shown in entirety in FIGS. 5 and 10), and that provides for selection of transverse flow metering gap H. Likewise, lower die body 14, when positionable, has an axis of relative movement that defines a Z-axis of an X-Y-Z coordinate system (Z-axis movement of die body 14 is not shown in the drawing), and that provides for selection of transverse flow metering gap H. If desired, die body 16 and lower die body 14, when positionable, may be independently positioned to form transverse flow metering gap H.

Advantageously, die body 16 includes a generally planar upper surface 26 and a generally planar lower surface 28, and is located between a generally planar surface 18 of upper die body 12 and a generally planar surface 20 of lower die body 14. As illustrated, surface 20 may be an undercut rear portion 24 of lower die body 14.

Beneficially, the body assembly bolts extend through body bolt clearance holes 37 in die body 12, and through body bolt clearance holes 39 in die body 16 (only one of clearance holes 37,39 shown in FIG. 3), and are threaded into lower die body 14. When an inventive slot die includes a body shim 90, the body assembly bolts extend through body bolt clearance holes 38 in the body shim. As indicated in FIGS. 3 and 4, body bolt clearance holes 39,38 in Z-axis positionable die body 16 and body shim 90 are appropriately sized to provide for Z-axis movement of die body 16 and/or 14 to form transverse flow metering gap H, and to provide for appropriate Z-axis movement of the body shim. To assist understanding, body bolt clearance holes 39,38 are shown exaggerated in size relative to body bolt clearance holes 37. For clarity of the drawing, these features have been omitted from FIGS. 5, 6 and 8 to 11.

Body bolt 36 is shown in FIG. 3 in a forward position relative to clearance holes 38,39, and in FIG. 4 in a rearward position relative to clearance holes 38,39. Forward Z-axis positioning of die body 16 or rearward Z-axis positioning of lower die body 14 to select a relatively smaller transverse flow metering gap than gap H of FIG. 3, results in rearward positioning of the body assembly bolts relative to body bolt clearance holes 39 in die body 16. Continuing with respect to FIG. 4, forward Z-axis positioning of die body 16 also beneficially results in forward Z-axis positioning of the body shim, and accordingly also results in rearward positioning of the body assembly bolts relative to body shim clearance holes 38.

Flow passageway 30 includes a manifold 32 to facilitate transverse flow of a fluid across the width thereof (that is, along the X-axis of the X-Y-Z coordinate system), flow metering section 34 that provides transverse flow metering gap H and that is in fluid communication with manifold 32 to regulate the incremental transverse distribution of the fluid mass across the width thereof, and an exit channel 42 that includes final orifice 40 (the lip gap), which is the exit orifice of the flow passageway. The exit channel provides a flow resistance function. The two elongated arrows in flow passageway 30 show the general direction of fluid flow through slot die 10, including the main fluid outflow direction.

As shown, the exit channel and the lip gap may be provided by opposing surfaces 18,22 of die bodies 12,14. If desired and with reference to the description of the slot die of FIG. 2, a slot die in accordance with the invention, may include removably mounted lip inserts and, depending upon the particular processing requirements, lip shims to establish a predetermined lip gap. Furthermore, the lip gap may be provided by an adjustable lip responsive to conventional adjustment means. In the second condition of slot die 10, if it is desired for one lip to be positioned beyond the other lip (not shown except in prior art FIG. 2), die bodies 12, 14 are positionable along the Z-axis relative to one another.

Figure 6:
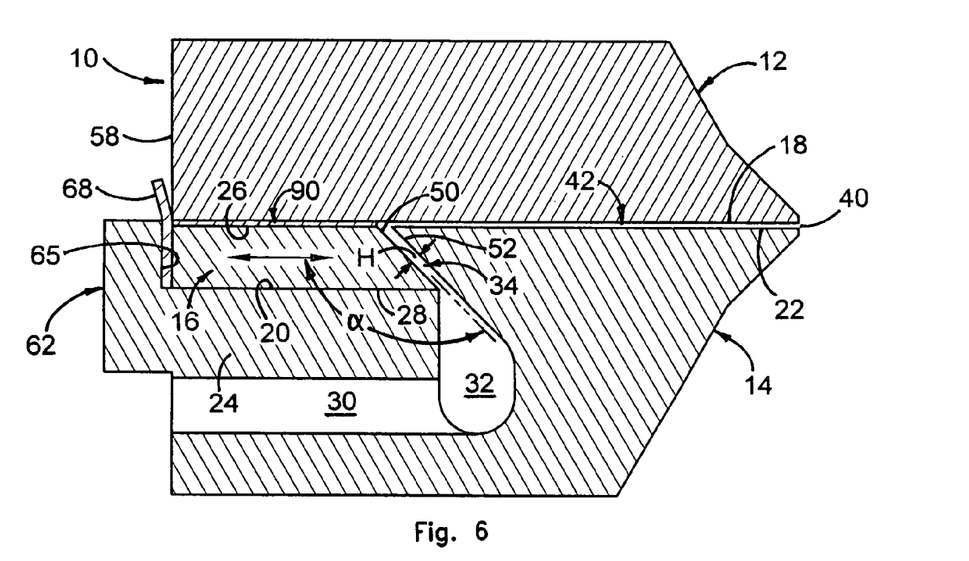
FIG. 6 is a simplified cross-sectional view taken at the center-line of another variation of the inventive slot die of FIG. 3 (the clearance aperture and alignment pin details shown in FIG. 5, here omitted as in FIGS. 3 and 4), which illustrates an obtuse angle of arrangement of a transverse flow metering section with respect to the Z-axis, and a die body positioned in a forward Z-axis direction using a removably disposed backing shim and an integral backing structure.

With continued reference to FIG. 3 in particular, die body 16 has a metering face 50 that beneficially cooperates with an opposing metering face 52 of lower die body 14 to form transverse flow metering section 34, and to provide transverse flow metering gap H. With particular reference to FIG. 4, flow metering section 34 has a length L in the main outflow direction. As shown, length L may be less than the length of metering face 50. Alternatively, as indicated in FIG. 6, flow metering section 34 may have a length that generally corresponds to the length of metering face 50. In any event, flow metering section 34 terminates at exit channel 42.

Figure 5:
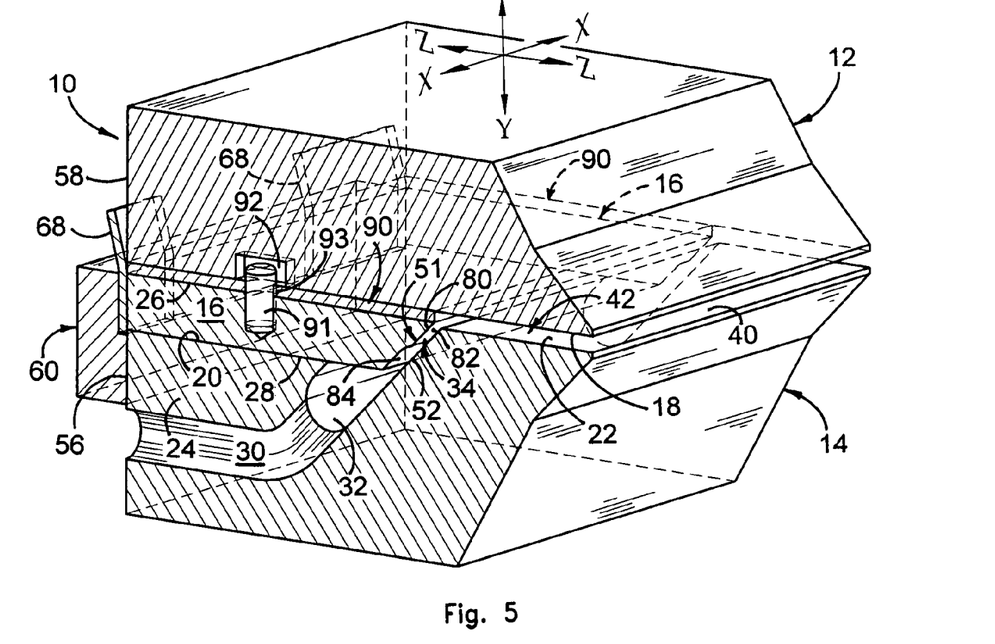
FIG. 5 is a simplified partial perspective view of a variation of the inventive slot die of FIG. 3, which includes a cross-sectional view taken at the center-line, which illustrates a die body positioned in a forward Z-axis direction using a plurality of removably disposed backing shims, and shows all three axes of the X-Y-Z coordinate system, and which illustrates the use of alignment pins and clearance apertures (only one clearance aperture and alignment pin shown) to allow positioning of a body shim consistent with the Z-axis movement of the die body.

As illustrated in FIGS. 3, 4 and 6, metering face 50 and opposing metering face 52 may be generally planar. However, the particular geometric shape to be used for a metering face of a tranverse flow metering section in accordance with the present invention is governed by fluid flow requirements and process objectives. For example, as illustrated by a variation of inventive slot die 10 shown in FIG. 5, and by the variations of the inventive slot die of FIG. 5 shown in FIGS. 7 to 11, and as described in further detail later, the transverse flow metering section may advantageously include a primary metering stage, and a secondary metering stage that has a relatively larger transverse flow metering gap than the primary metering stage.

With respect to the variations of slot die 10 shown in FIGS. 5 to 11, for sake of brevity of the description of the invention, identical reference numerals have been used in FIGS. 5 to 11 to indicate like parts of slot die 10 of FIG. 3. Similarly, with respect to the description of a second embodiment of an inventive slot die, for sake of brevity of the description, identical reference numerals have been used in FIGS. 12 and 13 to indicate like parts of slot die 10 of FIGS. 3 and 7.

The slot die shown in FIG. 3 differs from the slot die shown in FIG. 4 in that, for sake of illustration, different backing structures 60,61 are used. Simplified FIG. 5 shows some structural details omitted from simplified FIGS. 3, 4 and 6: one alignment pin 91 of a plurality of alignment pins, one clearance aperture 92 of a plurality of clearance apertures in die body 12, and one snugly fitting aperture 93 of a plurality of such apertures in body shim 90.

Advantageously in accordance with a first embodiment of the invention, after the body assembly bolts are unfastened, transverse flow metering gap H (shown in FIGS. 3 and 6) is adjustable by precise selectable positioning of metering face 50 of die body 16 in a Z-axis direction relative to opposing metering face 52 of die body 14. Alternatively, or in combination, lower die body 14 and metering face 52 thereof are positionable along the Z-axis relative to die body 16 for selection of transverse flow metering gap H. Beneficially, adjustment of the transverse flow metering gap in this way does not change or otherwise alter the lip gap.

Length L of transverse flow metering section (or channel) 34 is selected as required to accommodate the desired fluid flow processing objectives. Related to selecting length L, flow metering section 34 is arranged at an appropriate angle $\alpha$ relative to the Z-axis, which in a first inventive embodiment is the axis of movement of die body 16 and die body 14. Any suitable angle $\alpha$ may be employed consistent with the fluid processing objectives. Angle $\alpha$ may be an acute angle as illustrated in FIG. 3, a right angle (not shown), or an obtuse angle as illustrated in FIG. 6. Advantageously, flow metering section 34 is arranged at an angle $\alpha$ ranging from about 20° to 160°, relative to the Z-axis.

With respect to Z-axis positioning of die body 16 or 14, compared to an angle $\alpha$ of 60° or 120°, an angle $\alpha$ of 30° or 150° provides relatively greater adjustment precision of the transverse flow metering gap and a relatively longer forward face of die body 16 and hence a relatively longer metering section length. However, with respect to Y-axis positioning of die body 16 (which is later described in detail with reference to FIGS. 12 and 13), compared to an angle $\alpha$ of 30° or 150°, an angle $\alpha$ of 60° or 120° provides relatively greater adjustment precision of the transverse flow metering gap. Angle $\alpha$ is preferably an angle in the range of about 30° to 60° or of about 150° to 120°. Angle $\alpha$ is appropriately selected to provide the most suitable balance of fluid flow processing requirements, mechanical design integrity and operating functionality of the slot die.

With respect to Z-axis positioning of die body 16 or 14, an acute angle $\alpha$ of 45° (illustrated in FIG. 3) or an obtuse angle $\alpha$ of 135° (illustrated in FIG. 6) results in adjustment of the transverse flow metering gap by 0.7 units for each 1.0 unit of Z-axis movement of die body 16 or die body 14. A preferred balance between adjustment precision and metering section length of flow metering section 34, will typically be provided when angle $\alpha$ is selected from the group consisting of a range of about 40° to 50°, and a range of about 140° to 130°. An angle $\alpha$ of about 45° will typically provide the most accommodating balance between fluid flow requirements, operability requirements, and mechanical design requirements.

Figure 7:
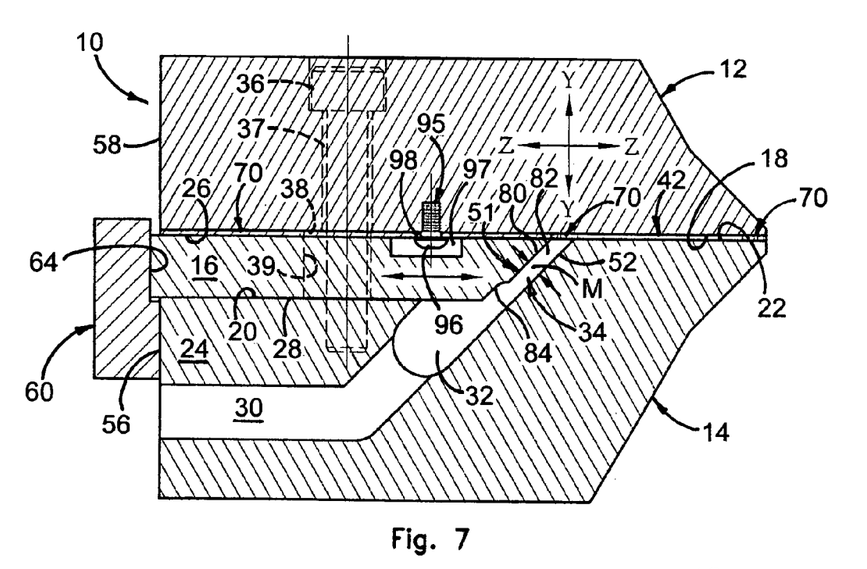
FIGS. 7 and 9 are simplified cross-sectional views taken at the center-line of a variation of the inventive slot die of FIG. 5, that includes a deckle shim instead of a body shim, and which views together illustrate selectable movement of a die body in a Z-axis direction from a relatively rearward position that provides a relatively greater predetermined transverse flow metering gap, to a relatively forward position that provides a relatively smaller predetermined fixed transverse flow metering gap, using a backing shim, and which illustrate the use of fasteners (only one shown) to maintain the deckle shim stationary, and of clearance apertures (only one shown) to allow the Z-axis die body movement.
Figure 8:
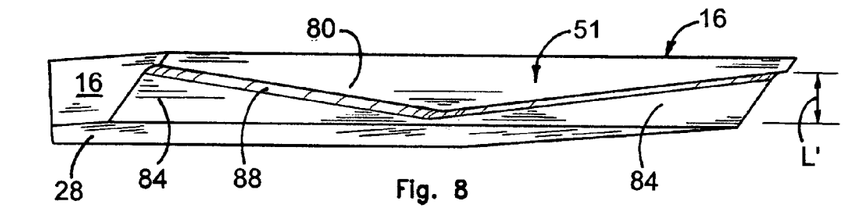
FIG. 8 is a partial perspective view of, in particular, the forward face of a die body of FIGS. 7 and 9.
Figure 9:
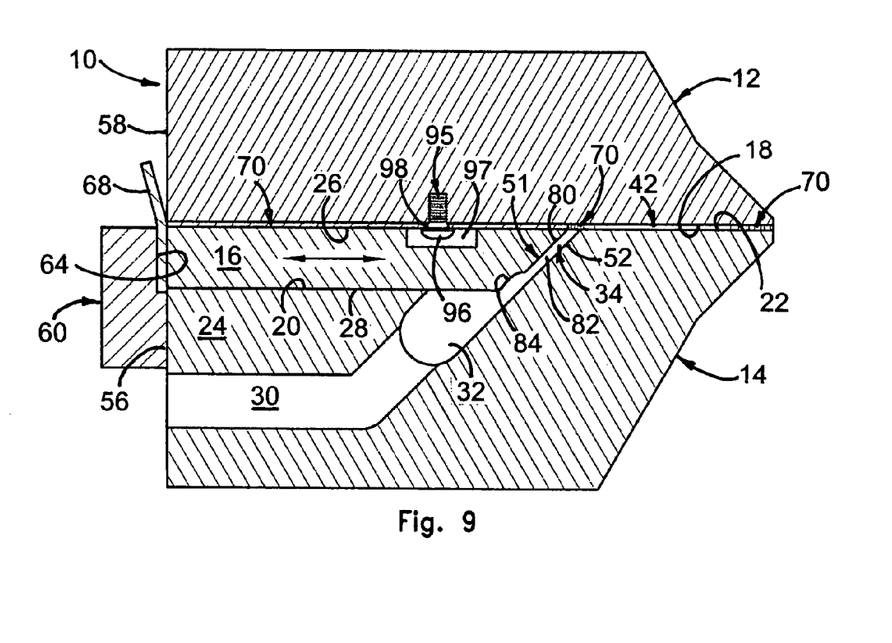
Figures 10, 11:
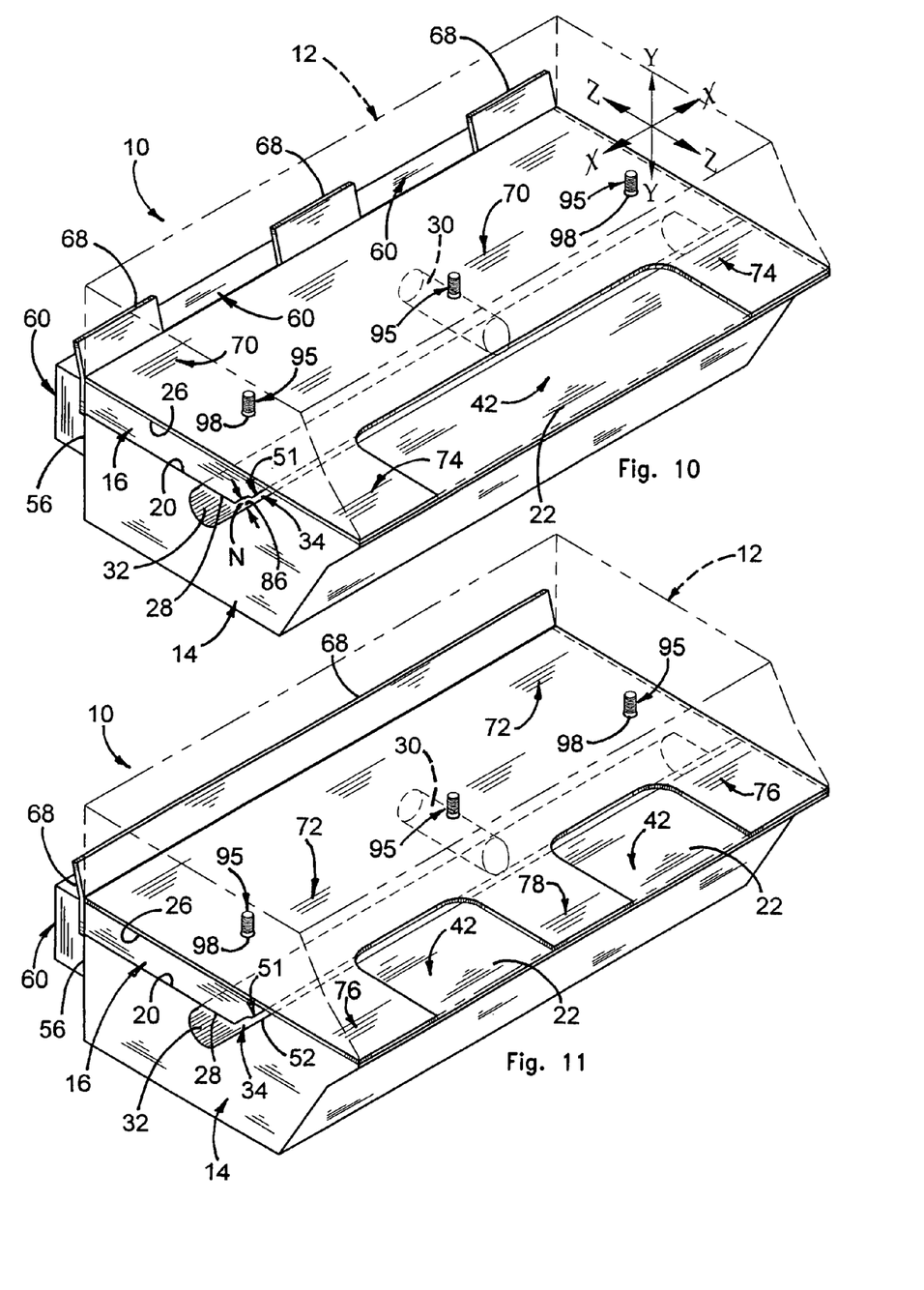
FIG. 10 is a simplified perspective view of the inventive slot die of FIG. 9 (end plates and certain other details omitted), which shows the upper die body in phantom, a plurality of removably disposed backing shims for predetermined positioning in a forward Z-axis direction, and which shows further details of the deckle shim.
FIG. 11 is a simplified perspective view like that of FIG. 10 of a variation of the inventive slot die of FIG. 7, which shows a single backing member, and a deckle shim for dividing a flow stream into two substreams.

With reference to FIGS. 5 and 7-11, an alternative geometric shape to metering face 50 of die body 16 is shown, and can best be seen in FIG. 8. Alternative metering face 51 provides a two stage flow metering section 34 defined by a length L' (shown in FIG. 8). With particular reference to FIGS. 7, 8, and 10, two stage flow metering section 34 includes a primary metering stage 82 having a gap M (shown in FIG. 7) and a secondary metering stage 86 having a gap N (shown in FIG. 10). Gap M is a relatively smaller metering gap than the gap of the secondary metering stage, and is the primary flow restricting gap. Length L' is constant from side to side of flow metering section 34, and the lengths of the two stages are inverse to one another. The two stages are provided by a raised surface 80 and an undercut surface 84 of face 51 as defined by length L'. A transition surface 88 is located between surfaces 80,84. For further details of two stage flow metering, reference is made to the pertinent portions of previously cited U.S. Pat. No. 5,256,052, which portions are hereby incorporated herein by reference.

As illustrated, raised surface 80 may be generally triangularly shaped. Surfaces 80,84 may be generally planar, generally arcuate along the X-axis, or be provided with any appropriate metering face shape along the X-axis consistent with fluid processing objectives or requirements. A multi-stage transverse flow metering section may be defined by metering face 52 of die body 14, if desired.

Referring again to Z-axis positioning of die body 16 or 14 and selecting angle $\alpha$, it may be appropriate for angle $\alpha$ to be substantially less than about 45°, for example about 30°, to provide additional forward face length compared to angle $\alpha$ of about 45°, and thus may benefit fluid flow requirements. Also to be considered is that because the metering section length also depends on the thickness (that is, the Y-axis dimension) of die body 16 in that a relatively greater thickness provides for a relatively longer metering section length, an angle $\alpha$ of about 45° in the case of die body 16 of relatively greater thickness, may provide the most accommodating design balance.

An inventive slot die may include a variety of backing structures, several of which are illustrated in the drawing by backing structures 60,61,62. With reference to FIGS. 3 and 7, removably mounted backing structure 60 is provided with an undercut area 64 that allows die body 16 to be selectably positioned in a rearward Z-axis direction, and for flow metering section 34 to be provided with a predetermined transverse flow metering gap H (shown in FIG. 3), or with a predetermined transverse flow metering gap M (shown in FIG. 7), of relatively greater size. With reference to FIG. 6, backing structure 62 integral to die body 14, is provided with a backing face 65. With reference to FIG. 4, removably mounted backing structure 61 includes a wall portion 66 that extends forward along the Z-axis for selectably positioning die body 16 in a forward Z-axis direction, and for flow metering section 34 to be provided with an alternative predetermined transverse flow metering gap of relatively smaller size. Conveniently, undercut area 64, backing face 65, and wall 66 may be generally planar. Furthermore, as can best be seen from FIG. 10, a backing structure may conveniently be generally coextensive in width to the width of a Z-axis positionable die body.

Backing structure 60 or 61 may be removably attached by fasteners (not shown) to a rear wall 56 of die body 14, or if desired, removably attached to a rear wall 58 of die body 12 (attachment to rear wall 58 of die body 12 not shown). Alternatively, a backing structure may be integral to die body 12. Regardless of the attachment location of a backing structure, Z-axis positioning of die body 16 and/or 14 for positioning metering faces 50,52 relative to one another provides a selectable gap H of transverse flow metering section 34 separate and apart from changing the lip exit gap.

A backing structure with an undercut area of more or less depth along the Z-axis may be selected as desired. Likewise a backing structure with a forwardly extending wall portion of greater or lesser extent along the Z-axis, may be selected as desired. If desired, the functional face of a backing structure may lack an undercut area or a forwardly extending wall portion.

Instead of a backing structure with a forwardly extending wall portion, a backing shim 68 of a selected generally uniform thickness may be used in combination with a backing structure provided with an undercut area or a backing face, for Z-axis positioning of die body 16 and/or 14 (see FIGS. 6 and 11), and for flow metering section 34 to be provided with a predetermined transverse flow metering gap of relatively smaller size than without the backing shim. As indicated in FIG. 11, a backing shim may be generally coextensive in width to the width of the die body to be positioned along the Z-axis.

Alternatively, as illustrated in FIGS. 5 and 10, a plurality of backing shims 68 of a common thickness may be spaced apart across the width of the die body to be positioned along the Z-axis. A greater or smaller number of backing shims than illustrated may be used, with different positioning than illustrated.

Depending upon fluid processing objectives or requirements, die body 16 of an inventive slot die, may be subjected to bending by the use of relatively centrally positioned backing shims of greater thickness in combination with relatively thinner shims positioned proximate to the ends of the die body causing metering face 50 to be generally arcuate along the X-axis, or if desired, may be subjected to an alternative positioning of the backing shims to produce an alternative arcuate shape along the X-axis of metering face 50. Other positioning of a plurality of shims of different thicknesses may be used to change the metering face shape along the X-axis, consistent with fluid processing objectives or requirements. Transverse flow metering section 34 of a slot die in accordance with the present invention, may be designed or adjusted to provide a predetermined uniform or non-uniform casting or coating thickness.

In the drawing, backing shims 68 are illustrated as extending upwardly from a backing structure and angled away from the rear wall of an inventive slot die. However, neither feature is necessary.

With particular reference to slot die 10 of FIGS. 3 to 5, 7, and 9 to 11, positioning of die body 16 or die body 14 in a Z-axis direction for adjustment of the transverse flow metering gap may be generally facilitated by cessation of fluid flow through the slot die, followed by loosening body assembly bolts 36 (one shown in FIGS. 3, 4 and 7; otherwise, as previously pointed out, bolts 36 omitted for clarity). As previously described, in the second condition of slot die 10, the body assembly bolts are unfastened so that die bodies 16,14 are selectably positionable relative to one another. As one skilled in the art would understand, for die bodies 16,14 to be positionable relative to one another, it typically will not be necessary to remove the body assembly bolts from die body 16. As previously explained, in the second condition, fluid processing is not feasible.

Before or after unfastening the body assembly bolts, the backing member fasteners (not shown) are loosened or removed. This step may be followed by, for example, removing any existing backing shim(s) 68 or backing member 61, as appropriate; and inserting or substituting backing shim(s) 68 of different appropriate thickness; or attaching a substitute backing member 61 of an appropriate different extent along the Z-axis. After the backing member fasteners are tightened, the slot die is suitably fastened together by the body assembly bolts. As previously described, this corresponds to the first or normal condition of slot die 10, in which fluid processing may be carried out. Thereafter, fluid flow through the slot die may be resumed.

Alternatively or in combination, after appropriately removing the body assembly bolts, die body 14 or 16 may be exchanged for a different die body, for example, having an alternative metering face and/or of different extent along the Z-axis. As previously described, in the second condition of slot die 10, the body assembly bolts are sufficiently unfastened to allow change to the relative Z-axis positioning of die bodies 12,14,16.

Accordingly, by use of an appropriate backing structure, with or without a backing shim or shims as appropriate, a predetermined transverse flow metering gap is obtained in an inventive first embodiment, with positive incremental adjustment by Z-axis movement of die body 16 from a relatively rearward position to a relatively forward position, or Z-axis movement of die body 14 from a relatively forward position to a relatively rearward position, or with negative incremental adjustment by Z-axis movement of die body 16 from a relatively forward position to a relatively rearward position, or Z-axis movement of die body 14 from a relatively rearward position to a relatively forward position.

With continued reference to a first embodiment of the invention and in particular to FIGS. 3 to 6, to provide for selection of the lip gap by the use of body shims of different thicknesses, independent and apart from changing the transverse flow metering gap, a slot die in accordance with the invention may include a body shim 90. In the first condition of an inventive slot die, die bodies 12,14,16 and body shim 90 are fastened together by the body assembly bolts, and body shim 90 is non-adjustable and suitably disposed in structural contact with load bearing die body 16. Conveniently, the body shim may be disposed between die body 12 and die body 16. In the second condition of an inventive slot die, body shim 90 is positionable, and beneficially is positionable in a Z-axis direction by movement consistent with Z-axis positioning of die body 16.

With reference to FIG. 5, conveniently, for Z-axis positioning of body shim 90 consistent with Z-axis positioning of die body 16, alignment pins 91 (only one shown) may extend from die body 16 into receiving apertures 92 (only one shown) in die body 12, through snugly fitting apertures 93 (only one shown) in the body shim. Beneficially, as illustrated, receiving apertures 92 are appropriately sized to provide clearance for movement of the alignment pins, consistent with Z-axis positioning of die body 16. Although not shown, a plurality of alignment pins and corresponding body shim apertures and receiving (or clearance) apertures in die body 12 may extend along the X-axis for this purpose. The shape of the clearance apertures, whether circular, rectangular, square or otherwise, is of no significance.

Alternatively, fasteners may extend through the body shim and may be threaded into die body 16 to secure the body shim to die body 16. In this variation, die body 12 may be provided with clearance apertures similar to the clearance apertures of FIG. 5, for movement of fastener heads in a Z-axis direction consistent with Z-axis positioning of die body 16.

Referring again to FIGS. 7 and 9-11, a slot die in accordance with the invention may include a deckle shim to provide for selection of the lip gap by the use of deckle shims of different thicknesses, and to provide for selection of the exit orifice width or dividing an outflowing stream into two or more streams, independent and apart from changing the transverse flow metering gap. As best understood from FIGS. 10 and 11, illustrative deckle shims 70, 72 include a least one leg 74, 76, respectively, that extends to the exit orifice.

A deckle shim is conveniently disposed generally parallel to the Z-axis, and in the first condition of an inventive slot die, die bodies 12,14,16 and the deckle shim are fastened together by the body assembly bolts. The deckle shim is suitably disposed in structural contact with die body 12. Conveniently, the deckle shim may be disposed in part between die body 12 and die body 16, and in part between die bodies 12 and 14, to establish a predetermined lip gap (in which case it functions in part as a body shim) and a predetermined metering orifice width.

Conveniently, in the second condition of an inventive slot die, a deckle shim may be maintained stationary relative to die body 12. With reference to FIGS. 7 and 9 to 11, and to die body 16 thereof, to maintain a deckle shim stationary relative to die body 12, the deckle shim may be secured to die body 12 using fasteners 95 (only one shown in FIGS. 7 and 9) having heads 96 (only one shown in FIGS. 7 and 9) that extend into clearance apertures 97 (only one shown in FIGS. 7 and 9) in die body 16. Beneficially, as illustrated, the clearance apertures in die body 16 are appropriately sized to provide clearance for Z-axis positioning of die body 16 without interference from the fastener heads. The fasteners extend through apertures 98 (only one shown in FIGS. 7 and 9) in the deckle shim and are threaded into die body 12. As indicated in FIGS. 10 and 11, a plurality of fasteners and corresponding deckle shim apertures and clearance apertures in die body 16 may extend along the X-axis for this purpose. The shape of clearance apertures 97, whether circular, rectangular, square or otherwise, is of no significance.

Illustrative deckle shims include deckle shim 70 of FIGS. 7, 9 and 10, and deckle shim 72 of FIG. 11. As illustrated in FIG. 11, a deckle shim commonly referred to as a rake type deckle, may further include at least one leg 78 to divide fluid outflow into two or more flow streams. Rake type deckles are employed in applications such as stripe coating. Other deckle shim constructions may be selected as desired or appropriate. The slot die of FIG. 10 also differs from the slot die of FIG. 11 in the use of a plurality of backing shims, instead of a single backing shim.

Figure 12:
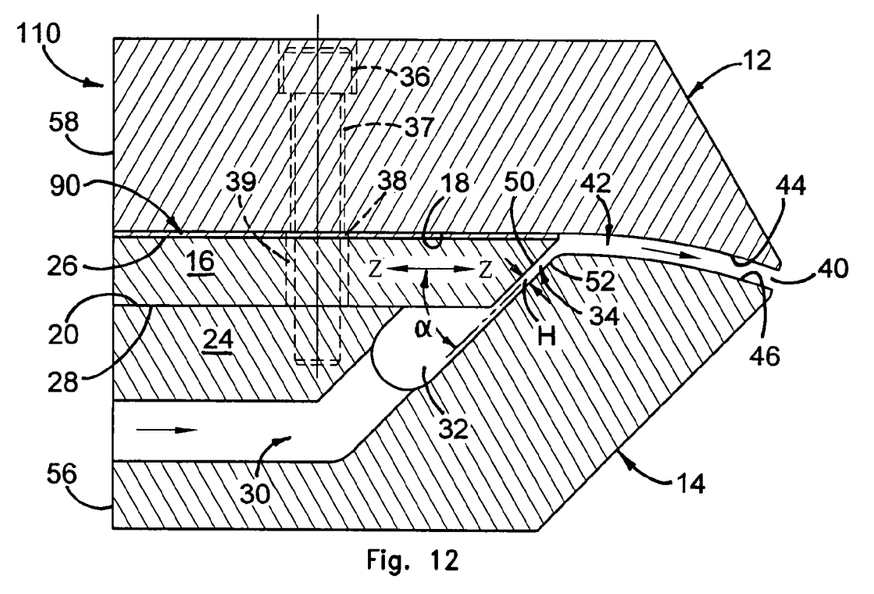
FIGS. 12 and 13 are simplified cross-sectional views taken at the center-line of a second embodiment of a slot die in accordance with the present invention, that includes a body shim and an especially exaggerated exit channel, and which views together illustrate selectable movement of a die body upward along the Y-axis to provide a relatively greater predetermined transverse flow metering gap, or downward along the Y-axis to provide a relatively smaller predetermined transverse flow metering gap, depending upon the original location of a body shim.
Figure 13:
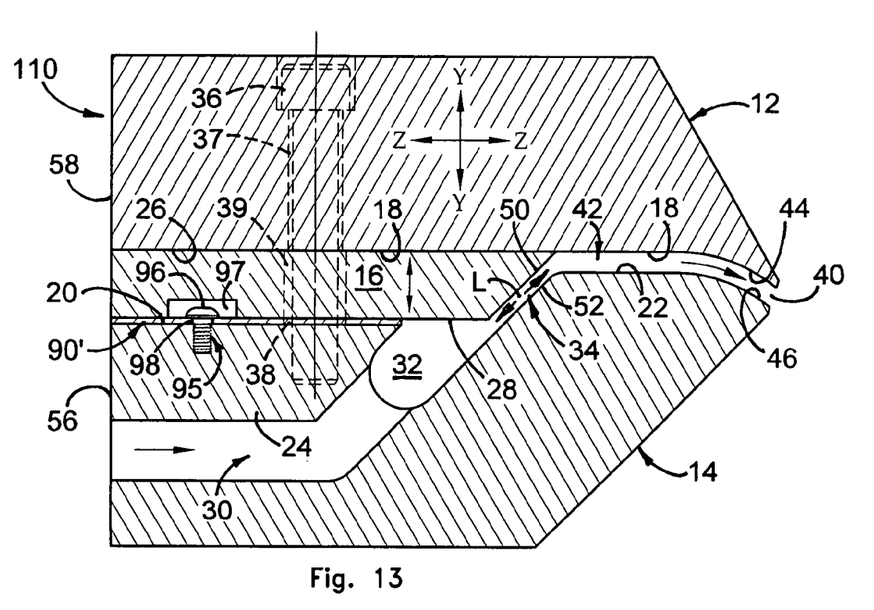

Referring now to a second embodiment of the invention and specifically to the inventive slot die of FIGS. 12 and 13, slot die 110 beneficially includes body shim 90 or 90', which may be of the same thickness. As previously explained, for sake of brevity of the description, identical reference numerals are used in FIGS. 12 and 13 to indicate like parts of slot die 10 of FIGS. 3 and 7. Slot die 110 includes body assembly bolts 36 (one shown in each Figure), body bolt clearance holes 37 (one shown in each Figure) in die body 12, body bolt clearance holes 38 (one shown in each Figure) in shim 90 or 90', and body bolt clearance holes 39 (one shown in each Figure) in die body 16.

As in the first embodiment, die bodies 12,14,16 are normally non-adjustable relative to one another. This corresponds to a first or normal condition of slot die 110, in which fluid processing may be carried out. In the first condition, die bodies 12,14,16 and body shim 90 or 90' are fastened together by the body assembly bolts, and there is no mechanical clearance between die body 12 and body shim 90, or between rear portion 24 of die body 14 and body shim 90', or between die body 16 and body shim 90 or 90', and, as a result, die bodies 12,14,16 and body shim 90 or 90' cannot be positioned relative to one another. In particular die body 16 is non-adjustable, and body shim 90 or 90' is beneficially suitably disposed in structural contact with load bearing die body 16. The body shim may be disposed between die body 12 and die body 16 (FIG. 12), or between die body 16 and die body 14 (FIG. 13). When body shim 90 and 90' are of the same thickness, either location provides an identical predetermined lip gap, and as a result, the transverse flow metering gap may be changed without changing the lip gap.

In a second condition of a second embodiment of an inventive slot die, the inventive slot die is appropriately disassembled to provide access to one or more body shims and die body 16. The disassembly includes withdrawal of the body assembly bolts sufficiently to selectably move die body 16 along the Y-axis to a position that provides a predetermined transverse flow metering gap. In the second condition, fluid processing is not feasible.

Moving die body 16 along the Y-axis from one position to another may involve changing the location of a body shim. For example, when angle $\alpha$ is an acute angle as shown in FIGS. 12 and 13, changing the location of a body shim from a location between die body 12 and die body 16 (shown in FIG. 12) to a location between die body 16 and die body 14 (shown in FIG. 13) moves die body 16 upward along the Y-axis and increases metering gap H (shown in FIG. 12) of transverse flow metering section 34. Length L (shown in FIG. 13), which corresponds to the length of flow metering section 34, is decreased. Conversely, reversing the location of a body shim moves die body 16 downward along the Y-axis and reduces metering gap H of transverse flow metering section 34.

On the other hand, when angle $\alpha$ is an obtuse angle (an obtuse angle is not shown except in FIG. 6), changing the location of a body shim from a location between die body 12 and die body 16 to a location between die body 16 and die body 14 can be advantageously used to decrease the metering gap of the transverse flow metering section. Conversely, reversing the location of a body shim when angle $\alpha$ is an obtuse angle, can be advantageously used to increase the metering gap of the transverse flow metering section.

Thus, FIGS. 12 and 13 illustrate that for a second inventive embodiment, metering gap H is selectable by positioning metering faces 50, 52 relative to one another. However, the relative positioning of metering faces 50,52 to one another is provided by Y-axis positioning. As illustrated by the same centrally located position of body bolts 36 in clearance holes 39 in die body 16 in FIGS. 12 and 13, die body 16 is positionable in a Y-axis direction without any Z-axis component to its movement.

In the first and second inventive embodiments, the exit channel may generally extend along the Z-axis, and fluid flow through the exit channel may generally be in a forward Z-axis direction. In FIGS. 12 and 13, the exit channel is formed in part by curved walls 44,46 of die bodies 12,14, respectively. In the slot die of FIG. 12, curved walls 44,46 begin relatively closer to transverse flow metering section 34, whereas in the slot die of FIG. 13, the beginning of exit channel 42 is formed by generally planar walls 18,22, which transition to curved walls 44,46 at a location relatively further from transverse flow metering section 34. However, the present invention is not necessarily limited to the use of an exit channel that extends generally along the Z-axis. The exit channel may, to the contrary, be oriented as desired or appropriate.

In the first and second inventive embodiments, to fasten die bodies 12,14,16 together, body assembly bolts 36 may extend through die body 12 and intermediately disposed die body 16 and be anchored in die body 14, and may beneficially be in axial alignment with the Y-axis of the X-Y-Z coordinate system. Y-axis alignment benefits functionality.

The first and second embodiments of the invention are not mutually exclusive. To the contrary, the second inventive embodiment may also utilize Z-axis positioning, and the first inventive embodiment may also utilize Y-axis positioning. For example, with reference again to FIGS. 12 and 13, die body 16 may be beneficially provided with a plurality of body bolt clearance holes 39 (only one shown in FIGS. 12 and 13), and body shim 90 of the slot die of FIG. 12 may advantageously include a plurality of body bolt clearance holes 38 (only one shown), appropriately sized to provide clearance for Z-axis positioning of die body 16 and/or die body 14, and for Z-axis movement of body shim 90. Beneficially, a backing structure as described in connection with a first embodiment of the invention, with or without shims or the like as appropriate, may be used in connection with Z-axis positioning.

To move body shim 90 consistent with Z-axis positioning of die body 16, alignment pins or fasteners that extend through the body shim may be used. In this regard, reference is made to the description of FIG. 5 when body shim 90 is located between die body 12 and die body 16, as illustrated in FIG. 12. When body shim 90' is located between die body 16 and die body 14 as illustrated in FIG. 13, body shim 90' may be secured to die body 14 using a plurality of fasteners 95 (only one shown) having heads 96 (only one shown) that extend into a plurality of clearance apertures 97 (only one shown) in die body 16. Beneficially, clearance apertures 97 are appropriately sized to provide for Z-axis movement of die body 16 if so desired, without interference from the fastener heads. The fasteners extend through a plurality of apertures 98 (only one shown) in the body shim and are threaded into die body 14.

Similarly, when slot die 10 includes body shim 90, a Z-axis positionable die body of a first embodiment of the invention may also be provided with Y-axis positioning. After disassembly of slot die 10 including sufficiently withdrawing the body assembly bolts to provide access to positionable die body 16 and body shim 90, Y-axis positioning may be accomplished without changing the lip gap, by changing a body shim from a location between die body 12 and positionable die body 16 to a location between positionable die body 16 and die body 14.

Two body shims of relatively less thickness but together of substantially the same thickness as body shim 90, may be used, with one body shim being located between die bodies 12,16, and the second body shim being located between die bodies 14,16. In this way, the transverse flow metering gap may have a relatively smaller change, and the lip gap is not changed. If a change to the lip gap were desired, the combined body shim thickness could exceed the thickness of body shim 90. Other variations within the scope of the present invention, will become apparent to one skilled in the art.

Advantageously, in the inventive technology, transverse flow metering gap adjustment may be obtained independent of changing other flow channel metering gaps. In slot die casting or coating processes, adjustment of a transverse flow metering gap without changing or otherwise altering the lip gap can be beneficial or necessary to accommodate process changes such as different flow rates, different fluid viscosities, and different process objectives. Beneficially, the inventive slot die allows selecting a different lip gap by the use of body shims or otherwise, without changing the transverse flow metering gap. Advantageously, the inventive slot die allows selecting a different exit orifice width or dividing an outflowing stream into two or more flow streams by the use of deckle shims, without changing the transverse flow metering gap.

Various modifications and combinations have been described. The present invention may be carried out with other modifications and/or combinations without departing from the spirit or essential attributes thereof. Accordingly, reference should be made to the appended claims as indicating the scope of the invention.

The invention claimed is:

1. A slot die comprising a flow passageway that comprises a transverse flow-providing manifold, a flow metering section that comprises a transverse flow metering gap and that is in fluid communication with said transverse flow-providing manifold and with an exit channel that leads to an exit orifice that provides a final gap of the flow passageway; and comprising a first die body, a second die body having a metering face, a third die body having an opposing metering face, and a plurality of body assembly fasteners;

wherein in a fastened condition of said slot die wherein said plurality of body assembly fasteners fasten said first die body, said second die body and said third die body together, said second die body of said slot die is a load bearing member with respect to the force exerted by said plurality of body assembly fasteners, and the opposing metering faces of said second die body and said third die body are non-adjustable and form said transverse flow metering gap of said transverse flow metering section, and wherein in an unfastened condition of said slot die, said second die body of said slot die is selectively positionable along the Z-axis of an X-Y-Z coordinate system for changing said transverse flow metering gap independent of change to the exit orifice by movement of the positionable second die body along said Z-axis.

2. The slot die of claim 1, wherein said exit channel is formed by said first die body and said third die body being spaced apart by said second die body.

3. The slot die of claim 2, further comprising a shim suitably disposed in contact with said second die body for selection of the exit orifice gap.

4. The slot die of claim 2, further comprising in said unfastened condition, a body shim positionable in a Z-axis direction consistent with said Z-axis of movement of the positionable second die body.

5. The slot die of claim 3, wherein said shim is a deckle shim that comprises a least one leg that extends to said exit orifice.

6. The slot die of claim 5, wherein in said unfastened condition, said deckle shim is maintained stationary regardless of said Z-axis of movement of the positionable second die body.

7. The slot die of claim 1, wherein said flow metering section comprises a primary metering stage, and a secondary metering stage that provides a relatively larger transverse flow metering gap than said primary metering stage.

8. The slot die of claim 1, wherein said flow metering section is disposed at an angle α selected from a suitable acute angle, a right angle and a suitable obtuse angle, relative to said Z-axis.

9. The slot die of claim 8, wherein said angle α is selected from the group consisting of a range of about 30° to 60°, and a range of about 150° to 120°, relative to said Z-axis.

10. The slot die of claim 1, wherein said plurality of body assembly fasteners are in axial alignment with the Y-axis of said X-Y-Z coordinate system, and extend through said second die body.

11. The slot die of claim 2, wherein said exit channel extends generally along said Z-axis.

12. The slot die of claim 1, further comprising a backing structure, and at least one removable backing shim of a selected thickness and disposed between a functional face of said backing structure and a rear wall of said second die body.

13. The slot die of claim 1, further comprising a backing structure wherein said backing structure comprises a functional face that extends forward in a Z-axis direction a selected extent for providing said transverse flow metering gap with a predetermined dimension.

14. The slot die of claim 6, further comprising a plurality of deckle shim fasteners that extend through said deckle shim and that secure said decide shim to said first die body, wherein said second die body is provided with a plurality of clearance apertures that prevent interference of said plurality of deckle shim fasteners with movement of said second die body in a Z-axis direction.

15. The slot die of claim 1, wherein in said unfastened condition, said third die body of said slot die is positionable along said Z-axis for changing said transverse flow metering gap independent of change to the exit orifice.

16. The slot die of claim 2, wherein said exit channel is bounded by opposing surfaces of said first die body and said third die body.

17. The slot die of claim 1, wherein said first die body is spaced apart from said third die body.

* * * * *